3,255,599
METHOD AND APPARATUS FOR FREEZING FOOD AND OTHER PERISHABLES
Willard L. Morrison, Lake Forest, Ill., assignor to Elmwood Products, Inc., New York, N.Y., a corporation of New York
Filed Jan. 14, 1965, Ser. No. 425,421
8 Claims. (Cl. 62—63)

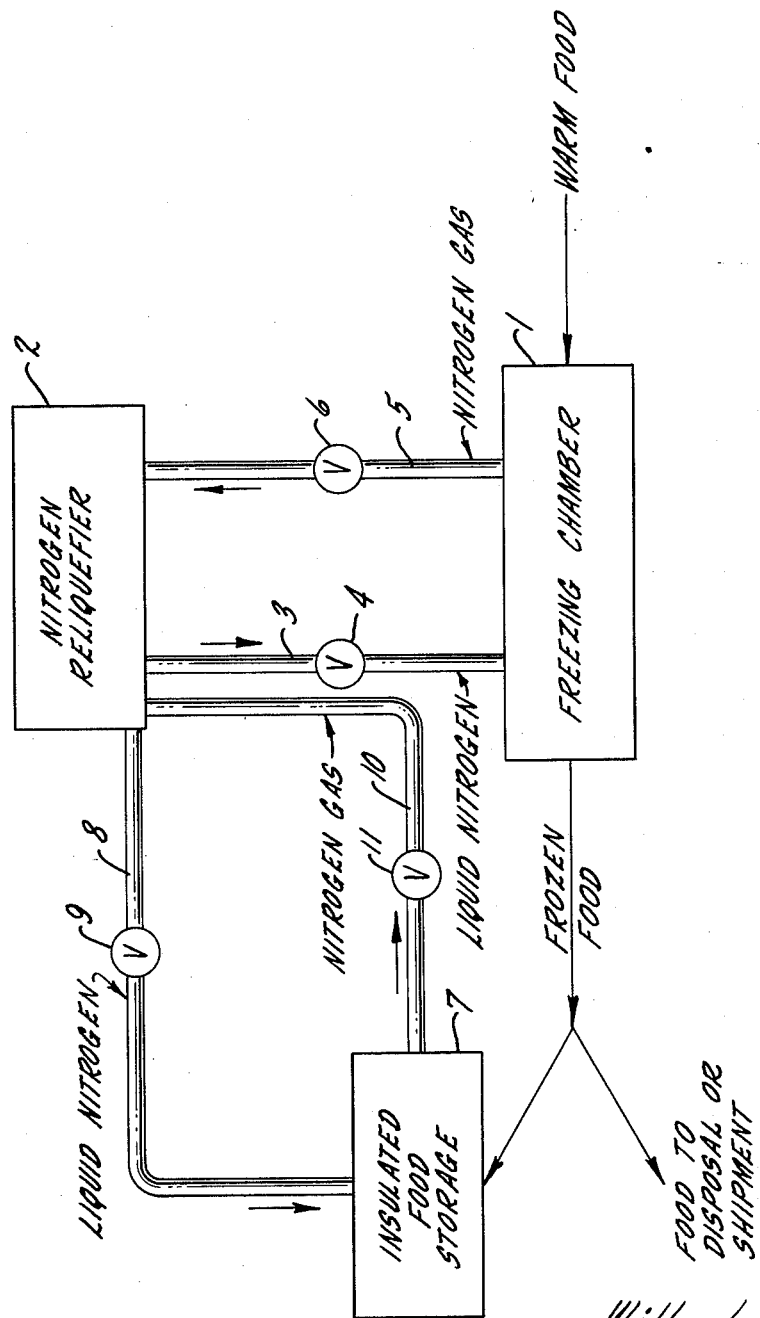

This invention relates to improvements in method and apparatus for freezing food and other perishables.

One object of the invention is to make it possible to gasify, reliquefy and reuse liquid nitrogen in a food freezing system where the supply and reliquefaction and reuse of the nitrogen may be continuous, independent of variations in the rate of supply of material to be frozen.

Another object is to provide in a food freezing system controlled means for freezing all the food to a predetermined low temperature and for thereafter freezing selected quantities of the food to selected lower temperatures.

A system such as that covered by this invention is especially well adapted to the freezing of cooked food as from a kitchen or a bakery. The flow of such food to the freezing zone may under some circumstances be substantially continuous. Under other circumstances it will be intermediate between full load and no load. Under other circumstances the rate of flow may vary. When such food is to be frozen by the use of liquid nitrogen and whenever liquid nitrogen having been evaporated at atmospheric pressure is in the interest of economy to be reliquefied, the reliquefying apparatus must operate continuously. This invention, in order to make that possible, contemplates a variable controlled supply of liquid nitrogen to a freezing chamber in consonance with the rate of input of warm food, together with a control of the rate of supply of the gaseous nitrogen to the reliquefying system, together with a variable control of the rate of flow of liquid and gaseous nitrogen between one or more insulated frozen food storage zones and a reliquefier. The result of this is that some of the food is discharged from the system at the maximum frozen temperature while other of the food before leaving the system is further frozen.

The food discharged from the freezing chamber will some of it be disposed of or shipped directly. Some of it will be discharged into one or more insulated food storage chambers which may be fixed in place or portable. As the supply of food to the freezing chamber varies between zero and a maximum, the supply of liquid nitrogen will also be varied and this will result in a variation of the supply of gaseous nitrogen to the reliquefying system. That part of the frozen food stored in the insulated storage chamber will be subjected to treatment by liquid nitrogen which because the food is still well above the freezing point of liquid nitrogen at atmospheric pressure will cause gasification of the nitrogen and the resultant gas can be returned to the reliquefier so that the total supply of gas supplied for reliquefaction may remain constant even though the amount of gas supplied from the freezing chamber or from the storage chamber may vary. The result of this is that food in the storage chambers may be stored and shipped at much lower temperatures than the food directly discharged from the freezing chamber, thus making it possible to control the time of storage and time of transit of selected quantities of the food in consonance with change in time or exposure.

Other objects will appear from time to time throughout the specification and claims.

This invention is illustrated in the diagrammatic flow sheet wherein a freezing chamber 1 is adapted to receive relatively warm food or perishable material to be frozen. Liquid nitrogen is supplied from any suitable source such as a nitrogen reliquefier 2. The liquid is fed through duct 3, controlled by remote control valve 4 to the freezing chamber for contact with the relatively warm food contained therein. The warm food vaporizes the liquid and the nitrogen gas is discharged through the duct 5 controlled by the remote control valve 6 back to the nitrogen reliquefier.

The nitrogen reliquefier is a suitable source of liquid nitrogen. It may have storage capacity so that at all times there will be available a supply of liquid nitrogen. It may receive liquid or gaseous nitrogen from some other source under some circumstances and it is intended under ordinary operation to operate continuously as a reliquefier, reliquefying the vaporized gas and making it available for reuse in the freezing chamber. A suitable reliquefier system is shown in Morrison Patent No. 2,926,-501. The details of the freezing chamber form no part of the present invention and are not illustrated but are disclosed in Morrison Patent No. 3,022,636.

The food frozen in the freezing chamber is discharged therefrom and may pass to an insulated food storage chamber 7. That chamber may be fixed or it may be an insulated freezer container and there may be one or more of them. Normally such food frozen to a temperature far below freezing but of course well above the boiling temperature of liquid nitrogen at atmospheric pressure will some of it at least be discharged into the food storage chamber. Other of the food may be separately discharged for disposal or shipment.

Liquid nitrogen may pass through the duct 8 from the reliquefier 2 to the food storage chamber 7 under control of the remote control valve 9. The liquid nitrogen will come in contact with the previously frozen food in the storage zone and will be vaporized by it, the vapor passing out through the duct 10 controlled by the remote control valve 11 to the reliquefier 2.

The temperature of the food in the storage zone will be above the temperature of the food supplied to the freezing chamber but will still be quite high enough to vaporize the liquid for return as gas to the reliquefier. The valves may be manually controlled or they may be remotely controlled in unison, the point being that for reasons quite apart from the operation of the reliquefying and freezing system, the supply of warm food to the freezing chamber may vary. It may even completely stop on occasion and since it is of the utmost importance to keep the reliquefier operating continuously even though there is no gas reaching it from the freezing chamber, the insulated food storage is provided so that when the supply of warm food stops, the valves 4 and 5 may be completely closed and the valves 9 and 11 may be opened to provide a flow of liquid to the storage chamber with return of gas to the nitrogen reliquefier. On the other hand, the valves may be proportionately opened to vary the relative rate of supply of liquid to and discharge of gas from the freezing and insulating food storage chamber, thus enabling continuous operation of the reliquefaction part of the system independent of variations in rate of supply of the warm food.

In operation, the temperature of the food discharged from the entire system should be varied in consonance with the destination of the warm food. Liquid nitrogen is expensive. It is economically wasteful to freeze food below the temperature needed to cause it to arrive at destination at a sufficiently low point. If, for example, the food is supposed to reach the grocer's freezer display counter at —10 degrees F. it may be frozen as it leaves the freezing chamber to —30 degrees F. Exposure to ambient air in shipper containers and the like can well raise the temperature up to —10 degrees F. It would be silly to freeze that food down to —100 degrees F. under those circumstances. On the other hand in the event that the food is expected to be exposed for a long time to ambient temperature, it may be highly desirable to have the starting point far below −30 degrees, perhaps as much as −100 degrees F. so while all of the food is frozen as it leaves the freezing chamber to a selected minimum, some of the food in the insulated food storage chamber is cooled far below and if there are several food storage chambers in the system, the temperatures in those chambers may be cooled by conducting those ducts to the chamber for greater or less time.

In the diagrammatic flow sheet remote control valves are indicated. They might be manually controlled depending upon the skill of the operator. They might be tied together by any suitable mechanical or electrical means so that one valve changes in the opposite direction at the same speed as the other. Any other suitable valve and control arrangement is appropriate provided the apparatus is so manipulated mechanically or automatically to insure that there will always be a supply of vaporized gas to the reliquefaction system to enable it to function at standard capacity at all times to avoid the danger, delay and expense of starting up or shutting down operations which would otherwise be necessitated by wide variations of the supply of food to be frozen in the freezing zone.

A reliquefaction apparatus in order to work effectively and economically works continuously at fixed maximum output. It must have a continuing supply of vaporized nitrogen as the raw material for reliquefaction because starting and stopping the operation of the reliquefier becomes prohibitively expensive.

The rate of evaporation of the liquid in the freezing zone depends largely upon the amount of warm food fed to the zone and the specific heat of such food. The freezing zone will work equally well within a fairly wide range of variation of warm food supply provided only that the rate of flow of the liquid is adjusted in consonance with the supply of food to be frozen. This does not fit in well with the requirement of the reliquefier because the smaller the quantity of liquid fed to the freezing zone, the smaller the quantity of gas supplied to the reliquefying zone.

In order to compensate for the variation in the amount of gaseous nitrogen discharged from the freezing zone, at least some of the food frozen in the freezing zone is stored in an insulated storage zone at substantially the temperature of discharge from the freezing zone. Then as the supply of liquid nitrogen to the freezing zone and the resultant discharge of gas to the reliquefying zone varies, this is compensated for by discharging liquid nitrogen into the food storage zone with return of an equivalent amount of nitrogen to assist in providing the raw material for the reliquefier. The relative supply of liquid to both zones may be controlled manually or automatically as the case may be.

The supply of liquid nitrogen to the storage zone decreases the temperature of the food below the discharge temperature from the freezing zone and that is an important advantage because much of the food shipped from the entire system is better shipped at temperatures below the discharge temperature from the freezing zone. Thus the storage zone always contains a stock pile of food frozen to a lower temperature than the normal freezing temperature. If a plurality of storage zones are used the discharge of liquid nitrogen to any of them may be selectively controlled so that a plurality of stock piles of different below zero temperatures is always available for shipment.

I claim:

1. In a freeze down apparatus, an insulated freezing chamber, means for supplying liquid nitrogen thereto, means for feeding relatively warm material thereto for freezing exposure to the liquid nitrogen, means for withdrawing the gas resulting from the exposure of the material to the liquid nitrogen from the freezing chamber for reliquefaction, an insulated storage chamber adapted to receive at least some of the material frozen in the freezing chamber, means for supplying liquid nitrogen to the storage chamber and for withdrawing therefrom the resultant vaporized nitrogen for reliquefaction, means for reliquefying the gas withdrawn from the freezing and from the storage chambers and using it in part at least for the supply of liquid nitrogen to the chambers.

2. In a freeze down apparatus, an insulated freezing chamber, means for supplying liquid nitrogen thereto, means for feeding relatively warm material thereto for freezing exposure to the liquid nitrogen, means for withdrawing the gas resulting from the exposure of the material to the liquid nitrogen from the freezing chamber for reliquefaction, an insulated storage chamber adapted to receive at least some of the material frozen in the freezing chamber, means for supplying liquid nitrogen to the storage chamber and for withdrawing therefrom the resultant vaporized nitrogen for reliquefaction, means for reliquefying the gas withdrawn from the freezing and from the storage chambers and using it in part at least for the supply of liquid nitrogen to the chambers,
   means for controlling the relative rate of flow of liquid nitrogen to the freezing and the storage chambers between zero and a maximum supply to each.

3. In a freeze down apparatus, an insulated freezing chamber, means for supplying liquid nitrogen thereto, means for feeding relatively warm material thereto for freezing exposure to the liquid nitrogen, means for withdrawing the gas resulting from the exposure of the material to the liquid nitrogen from the freezing chamber for reliquefaction, an insulated storage chamber adapted to receive at least some of the material frozen in the freezing chamber, means for supplying liquid nitrogen to the storage chamber and for withdrawing therefrom the resultant vaporized nitrogen for reliquefaction, means for reliquefying the gas withdrawn from the freezing and from the storage chambers and using it in part at least for the supply of liquid nitrogen to the chambers,
   means for controlling the relative rate of flow of liquid nitrogen to the freezing and the storage chambers between zero and a maximum supply to each,
   and means for controlling the return of gaseous nitrogen from the freezing and the storage chambers to maintain the pressure in said chambers at approximately atmospheric.

4. In a freeze down apparatus, an insulated freezing chamber, means for supplying liquid nitrogen thereto, means for feeding relatively warm material thereto for freezing exposure to the liquid nitrogen, means for withdrawing the gas resulting from the exposure of the material to the liquid nitrogen from the freezing chamber for reliquefaction, an insulated storage chamber adapted to receive at least some of the material frozen in the freezing chamber, means for supplying liquid nitrogen to the storage chamber and for withdrawing therefrom the resultant vaporized nitrogen for reliquefaction, means for reliquefying the gas withdrawn from the freezing and from the storage chambers and using it in part at least for the supply of liquid nitrogen to the chambers,
   means for controlling the relative rate of flow of liquid nitrogen to the chambers in consonance with the rate of evaporation of the liquid nitrogen in the freezing chamber.

5. The method of freezing food which consists in supplying relatively warm food to a freezing zone, exposing the feed in the freezing zone to liquid nitrogen supplied from a reliquefaction zone, returning the gas vaporized from the liquid in the freezing zone to the reliquefaction zone, storing at least some of the food frozen in the freezing zone in an insulated storage zone, supplying liquid nitrogen from the reliquefaction zone to the storage zone and returning the gaseous nitrogen vaporized from the liquid in the storage zone to the reliquefaction zone and using at least some of the liquid nitrogen from the reliquefaction zone for supplying both the freezing and the storage zones.

6. The method of freezing food which consists in supplying relatively warm food to a freezing zone, exposing the food in the freezing zone to liquid nitrogen supplied from a reliquefaction zone, returning the gas vaporized from the liquid in the freezing zone to the reliquefaction zone, storing at least some of the food frozen in the freezing zone in an insulated storage zone, supplying liquid nitrogen from the reliquefaction zone to the storage zone and returning the gaseous nitrogen vaporized from the liquid in the storage zone to the reliquefaction zone and using at least some of the liquid nitrogen from the reliquefaction zone for supplying both the freezing and the storage zones, varying the rate of supply of the liquid nitrogen to the freezing and storage zones between zero and a maximum.

7. The method of freezing food which consists in supplying relatively warm foot to a freezing zone, exposing the food in the freezing zone to liquid nitrogen supplied from a reliquefaction zone, returning the gas vaporized from the liquid in the freezing zone to the reliquefaction zone, storing at least some of the food frozen in the freezing zone in an insulated storage zone, supplying liquid nitrogen from the reliquefaction zone to the storage zone and returning the gaseous nitrogen vaporized from the liquid in the storage zone to the reliquefaction zone and using at least some of the liquid nitrogen from the reliquefaction zone for supplying both the freezing and the storage zones, varying the relative rate of supply of liquid nitrogen to the freezing and storage zones between zero and a maximum.

8. The method of freezing food which consists in supplying relatively warm food to a freezing zone, exposing the food in the freezing zone to liquid nitrogen supplied from a reliquefaction zone, returning the gas vaporized from the liquid in the freezing zone to the reliquefaction zone, storing at least some of the food frozen in the freezing zone in an insulated storage zone, supplying liquid nitrogen from the reliquefaction zone to the storage zone and returning the gaseous nitrogen vaporized from the liquid in the storage zone to the reliquefaction zone and using at least some of the liquid nitrogen from the reliquefaction zone for supplying both the freezing and the storage zones, varying the relative rate of supply of liquid nitrogen to the freezing and storage zones between zero and a maximum, in consonance with the rate of evaporation of liquid nitrogen in the freezing zone.

References Cited by the Examiner

UNITED STATES PATENTS

| 3,023,588 | 3/1962 | Morrison | 62—64 |
| 3,096,626 | 7/1963 | Morrison | 62—64 X |
| 3,100,971 | 8/1963 | Morrison | 62—64 |
| 3,104,977 | 9/1963 | Morrison | 99—192 |

ROBERT A. O'LEARY, *Primary Examiner.*